Sept. 3, 1968    H. DRECKMANN    3,400,069
APPARATUS FOR CONTINUOUSLY DRYING GAS
Filed Dec. 9, 1966    2 Sheets-Sheet 1
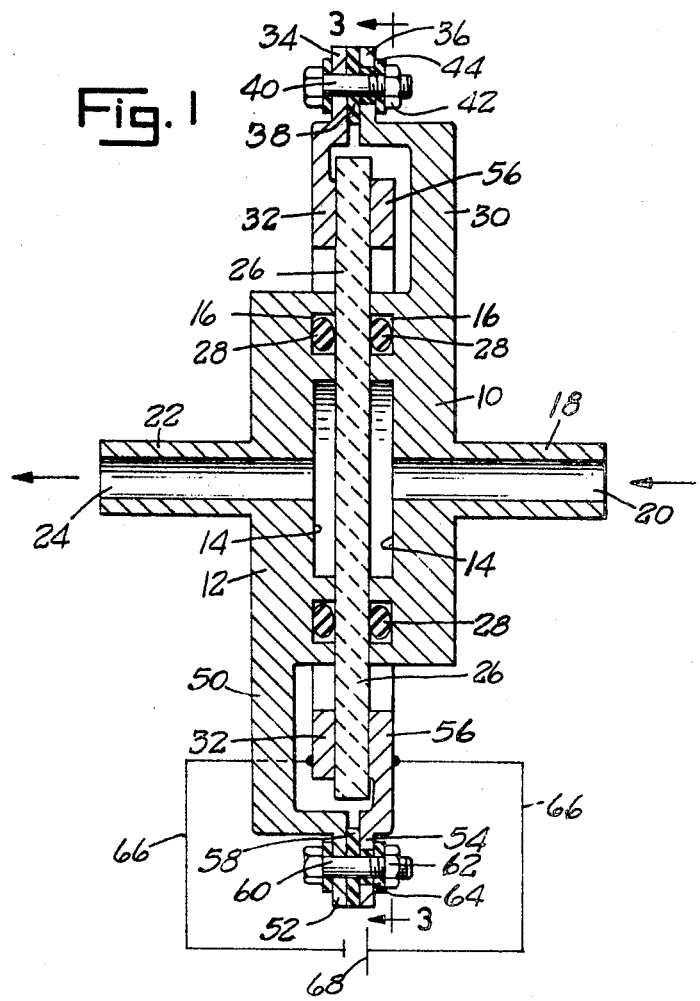
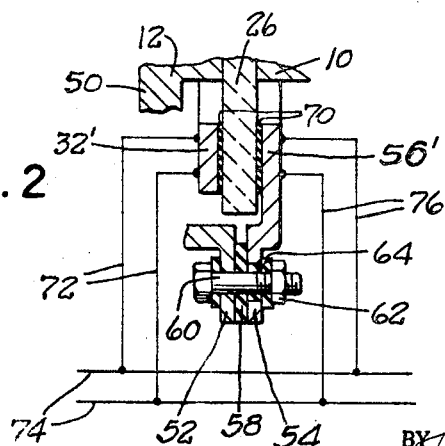
INVENTOR.
HUBERT DRECKMANN
BY Eugene C. Knoblock
ATTORNEY

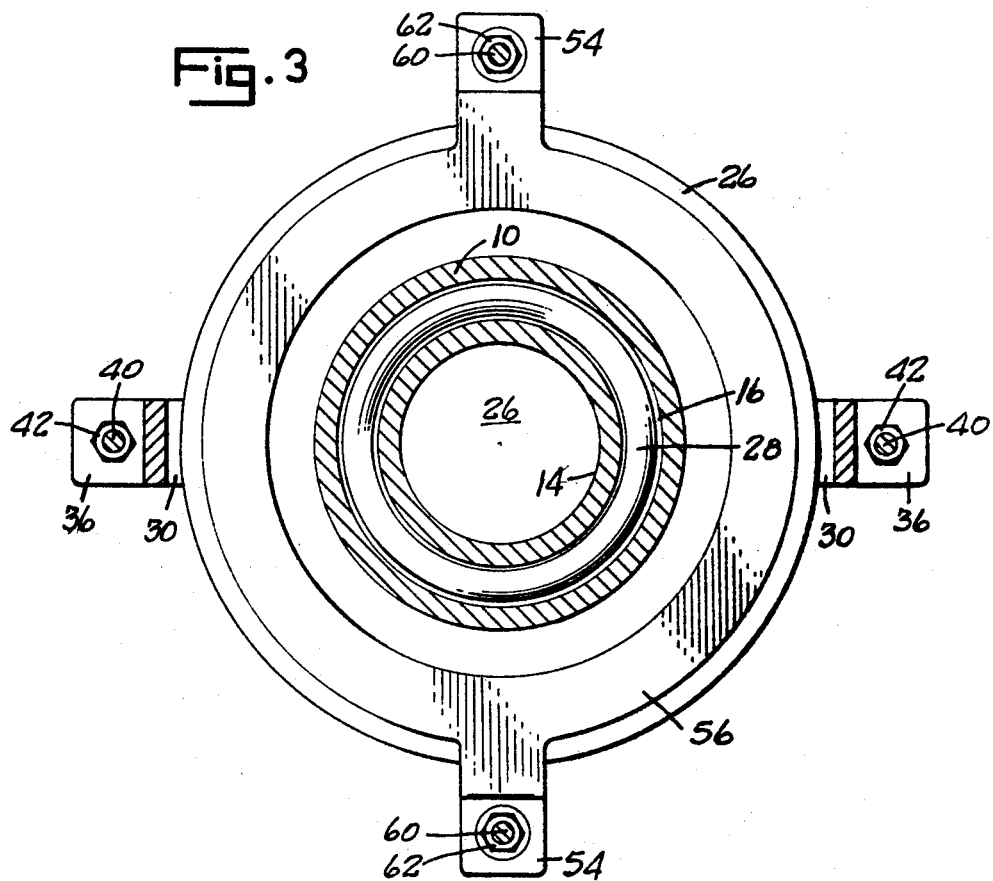
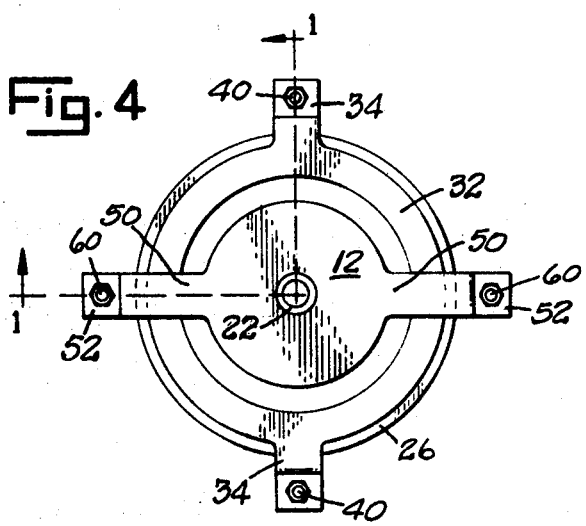

United States Patent Office 3,400,069
Patented Sept. 3, 1968

3,400,069
APPARATUS FOR CONTINUOUSLY DRYING GAS
Hubert Dreckmann, Michigan City, Ind., assignor to The Hays Corporation, a corporation of Indiana
Filed Dec. 9, 1966, Ser. No. 600,446
6 Claims. (Cl. 204—278)

ABSTRACT OF THE DISCLOSURE

A continuous, gas drying apparatus wherein a gas is passed through a gas-pervious hygroscopic filter spanning a gas flow path, said filter having a marginal portion exposed to the action of means to dry it.

---

The analysis of a gas sample to determine the percentage of a particular gas component within a gas sample when performed by electrically operated apparatus, such as a paramagnetic oxygen detector or a thermal conductivity detector, and other processes and apparatus responsive to or controlling the composition of a gas, ideally require that the moisture content of the gas be constant or that the gas be substantially free from moisture content. This requirement has led to the use of a humidifier in conjunction with gas analyzers of the thermal conductivity type in order to be sure that the sample gas and the standard being analyzed have the same humidity.

It is the primary object of this invention to provide a device for use with an electrically operated gas analyzer and in processes in which the composition of a gas or control of a gas composition is a factor, which will dry gas flowing therethrough to insure that the humidity thereof is sufficiently low and substantially constant to avoid adverse effects due to the presence of excessive moisture or to variations of the moisture content of the gas sample.

A further object is to provide a device of this character wherein gas is passed through a hygroscopic filter which absorbs the moisture therein and diffuses the same and the moisture is removed from the filter externally of the portion thereof through which gas flow is directed.

A further object is to provide a device of this character having a chamber to which gas inlet and outlet conduits are connected and which is spanned by a hydroscopic filter having a sealed connection with the device spaced inwardly from its margin and being marginally exposed to the effect of moisture removing means outwardly of said sealed connection.

Other objects will be apparent from the following specification.

In the drawing:

FIG. 1 is a sectional view of one embodiment of the device taken on line 1—1 of FIG. 4.

FIG. 2 is a fragmentary sectional view of a modified form of the device.

FIG. 3 is a sectional view taken on line 3—3 of FIG. 1.

FIG. 4 is a face view of the device.

Referring to the drawings, and particularly to FIGS. 1, 3 and 4, which illustrate a preferred embodiment of the invention, for use in a line supplying a sample gas to a gas analyzer, the numeral 10 designates one housing part and the numeral 12 designates a second housing part. The housing parts 10 and 12 are preferably similar and each is characterized by a central recess or chamber-defining portion 14 at its inner face and an endless groove 16 in its inner face surrounding and spaced from the recess 14 and spaced inwardly from its outer edge. Housing part 10 has a tubular projection 18 whose bore 20 communicates with the recess 14 and defines a gas inlet passage. Housing part 12 has a tubular projection 22 whose bore 24 communicates with the recess 14 and constitutes an outlet passage. The inlet passage will be connected to the source of a gas sample and the passage 24 is connected with or leads to the gas inlet of the gas analyzer (not shown).

A plate or disc 26 of hygroscopic material of substantially flat character and of substantially uniform thickness, porosity and gas-perviousness is interposed between the housing parts 10 and 12 and projects outwardly therefrom and therearound, as on all radii thereof. Endless resilient sealing rings 28, each having a cross-sectional dimension greater than the depth of groove 16 in which it seats, bear against the opposite faces of the hygroscopic member 26 to effect a gas-tight seal between the housing parts and the hygroscopic member when the device is operatively assembled.

Any suitable means may be provided to interconnect the housing parts 10 and 12 and clamp the hygroscopic member therebetween to effect and maintain the seals at 28. As here illustrated, the housing part 10 has two or more circumferentially spaced substantially radially extending projections 30 which extend outwardly beyond the outer edge of the hygroscopic member 26 and in spaced relation to the marginal portion thereof projecting beyond the member 10. A clamping ring 32 encircles the opposite housing part 12 bearing against the face of the projecting marginal part of the hygroscopic member 26. Portions 34 project outwardly from the ring 32 beyond the periphery of the hygroscopic member 26 and register with parts 36 of the projection 30. Parts 34 and 36 are spaced by a yielding spacer 38 interposed therebetween and are interconnected by suitable securing means such as bolts 40 and nuts 42. The spacer 38 is preferably an electrical insulator, and cooperates with electric insulation means 44, such as sleeves surrounding the shanks of the bolts and underlying the nuts 42, to insure against electric current flow between the ring 32 and the projections 36 of the housing part 10.

The housing part 12 is preferably symmetrical with or complementary to the housing part 10 and has radially extending projections 50, each with an apertured end part 52 and each confronting an apertured projection 54 extending outwardly from a ring 56 engaging the marginal portion of the hygroscopic member 26 in opposed clamping relation to the ring 32. The parts 52 and 54 are separated by a resilient insulating spacer 58 and are interconnected by bolts 60 and nuts 62. Electrical insulation means 64, such as sleeves 64, cooperate with the spacer 58 to electrically insulate the ring 56 from the housing part 12.

The hygroscopic filter member 26 may be a sintered ceramic member, such as calcium chloride ($CaCl_2$) or magnesium chloride ($MgCl_2$). The member 26 shall be sufficiently porous to permit the flow of gas therethrough and the absorption and diffusion of moisture therein. The filter 26 may be formed in any suitable manner, and in one form may be a pressed sintered hygroscopic or ceramic material with an imbedded metal screen for reinforcement.

The two rings 32 and 56 constitute ring electrodes and are connected in a circuit by leads 66, which circuit is provided with a suitable current source 68 of any suitable voltage, which may range from 6 volts to 100 volts, or more. Current flow between the electrode rings 32 and 56 and through the moist margin of filter 26 causes electrolytic decomposition of moisture in the filter margin and accommodates continuous moisture diffusion from the center to the margin of the filter. Any suitable means may be provided to regulate the current flow between the electrodes, and the current flow will preferably be proportional to the water content of the filter. The voltage in the circuit will preferably be approximately inversely proportional to the conductivity of the moisture bearing filter.

In use, the device will preferably be positioned with the hygroscopic member 26 substantially horizontal and the inlet passage 20 lowermost. As moisture containing gas enters the inlet 20 and the communicating chamber 14, it encounters the hygroscopic filter 26. The gas will be under a sufficient pressure to pass through the porous hygroscopic filter 26 and into the chamber 14 of the upper housing part 12 for discharge at the outlet passage 24. As the gas passes through the hygroscopic filter 26, the filter absorbs the moisture therefrom and this moisture diffuses or spreads to the margin of the filter outwardly of the housing parts 10 and 12. No escape of gas from the device occurs inasmuch as the seals 28 seal both of the housing chambers 14 and the gas passages through the filter by following the path of least resistance. As the moisture diffusion within the filter results in moistening of the marginal portion of the filter 26 between the electrode rings 32 and 56, the moisture is electrolytically decomposed at the filter margin by the current flow between said ring electrodes.

The electrolyzing device is self-regulating inasmuch as the hygroscopic member 26 is an electrical insulation. Hence, if no moisture is present in the margin of member 26, no current flows between the electrodes 32 and 56 and through the member 26.

Instead of electrolyzing the moisture diffused to the margin of the filter 26 as a means to remove the moisture, that is to dry the marginal portion of the filter, this action may be accomplished by heating the marginal portion of the filter 26 projecting from the housing parts 10 and 12. One construction for accomplishing this result is illustrated in FIG. 2, wherein similar parts have the same reference numerals heretofore used. In this construction, each of the electrode rings 32' and 56' is formed of electrical resistance material and electrical insulation material 70 is interposed between the filter 26 and the rings 32' and 56'. Electrode 32' is connected by leads 72 with a current source 74 and ring 50' is connected by leads 76 with current source 74. In this construction, it will be apparent that as current flows through the rings 32' and 50' the rings become heated and exert a drying action upon the marginal portion of filter part 26 to which moisture passes by diffusion.

It will be apparent that the operation of the device entails a method of continuously removing moisture from a gas which entails the following steps:

(1) Continuously passing a gas in a predetermined gas-confining flow path and through the central part of a porous hygroscopic member which spans said flow path and includes a marginal part which projects laterally therefrom whereby moisture absorbed by said central part of said porous member diffuses throughout the porous member, and (2) Subjecting the marginal part of said porous member to the action of either (a) electrolyzing means, or (b) heating means to withdraw moisture from said marginal part of said porous member.

While preferred embodiments of the invention have been illustrated and described, it will be understood that changes in the construction may be made within the scope of the appended claims without departing from the spirit of the invention.

I claim:

1. Means for continuously drying gas, comprising a two-part housing defining a gas chamber having a gas inlet passage in one part and a gas outlet passage in the other part, a hygroscopic member clamped between portions of said housing parts surrounding said gas chamber and each having an endless groove therein spaced outwardly from said chamber, endless resilient seal members seated in said grooves and contacting opposite faces of said hygroscopic member to seal said gas chamber and permit moisture diffusion therepast through said hygroscopic member, the marginal portion of said hygroscopic member projecting outwardly of said clamping portions, and electrically energized means carried by said housing and extending outwardly of said clamping means and uniformly juxtaposed to said marginal portion, said last named means being operative to remove diffused moisture from said marginal portion.

2. Means for continuously drying gas as defined in claim 1, wherein said moisture removing means constitute electrodes contacting opposite faces of the projecting marginal portion of said hygroscopic member.

3. means for continuously drying gas as defined in claim 1, wherein said moisture removing means constitute electrode rings contacting opposite faces of the projecting marginal portion of said hygroscopic member and carried by, but electrically insulated from said housing parts, and means for applying an electric charge to said electrodes to electrolyze moisture in said marginal portion of said hygroscopic member.

4. Means for continuously drying gas as defined in claim 1, wherein said moisture removing means constitutes means for heating the marginal portion of said hygroscopic member.

5. Means for continuously drying gas as defined in claim 1, wherein said moisture removing means constitutes an electric resistance heating element juxtaposed to and electrically insulated from said marginal portion of said hygroscopic member, and means for energizing said heating element.

6. Means for continuously drying gas as defined in claim 1, wherein endless electric resistance members engage opposite faces of the margin of the hygroscopic member, means electrically insulating said resistance members from said hygroscopic member, and means for energizing said resistance members.

References Cited

UNITED STATES PATENTS

| | | | |
|---|---|---|---|
| 1,193,335 | 8/1916 | Acheson | 210—445 |
| 3,031,082 | 4/1962 | Smith | 210—445 |
| 3,188,283 | 6/1965 | Cole | 204—129 |
| 3,250,059 | 5/1966 | Vosseller | 55—90 |
| 3,313,718 | 4/1967 | Bloch | 204—129 |

REUBEN FRIEDMAN, *Primary Examiner.*

C. N. HART, *Assistant Examiner.*